Oct. 28, 1952 R. ADLER 2,616,036

SIGNAL TRANSLATING APPARATUS

Filed Dec. 29, 1948 2 SHEETS—SHEET 1

ROBERT ADLER
*INVENTOR.*

BY [signature]

HIS AGENT

Oct. 28, 1952 R. ADLER 2,616,036

SIGNAL TRANSLATING APPARATUS

Filed Dec. 29, 1948 2 SHEETS—SHEET 2

ROBERT ADLER
*INVENTOR.*

BY Bruce Richards

HIS AGENT

Patented Oct. 28, 1952

2,616,036

UNITED STATES PATENT OFFICE 2,616,036

SIGNAL TRANSLATING APPARATUS

Robert Adler, Chicago, Ill., assignor to Zenith Radio Corporation, a corporation of Illinois Application December 29, 1948, Serial No. 69,341

15 Claims. (Cl. 250—20)

Figures 1, 2:
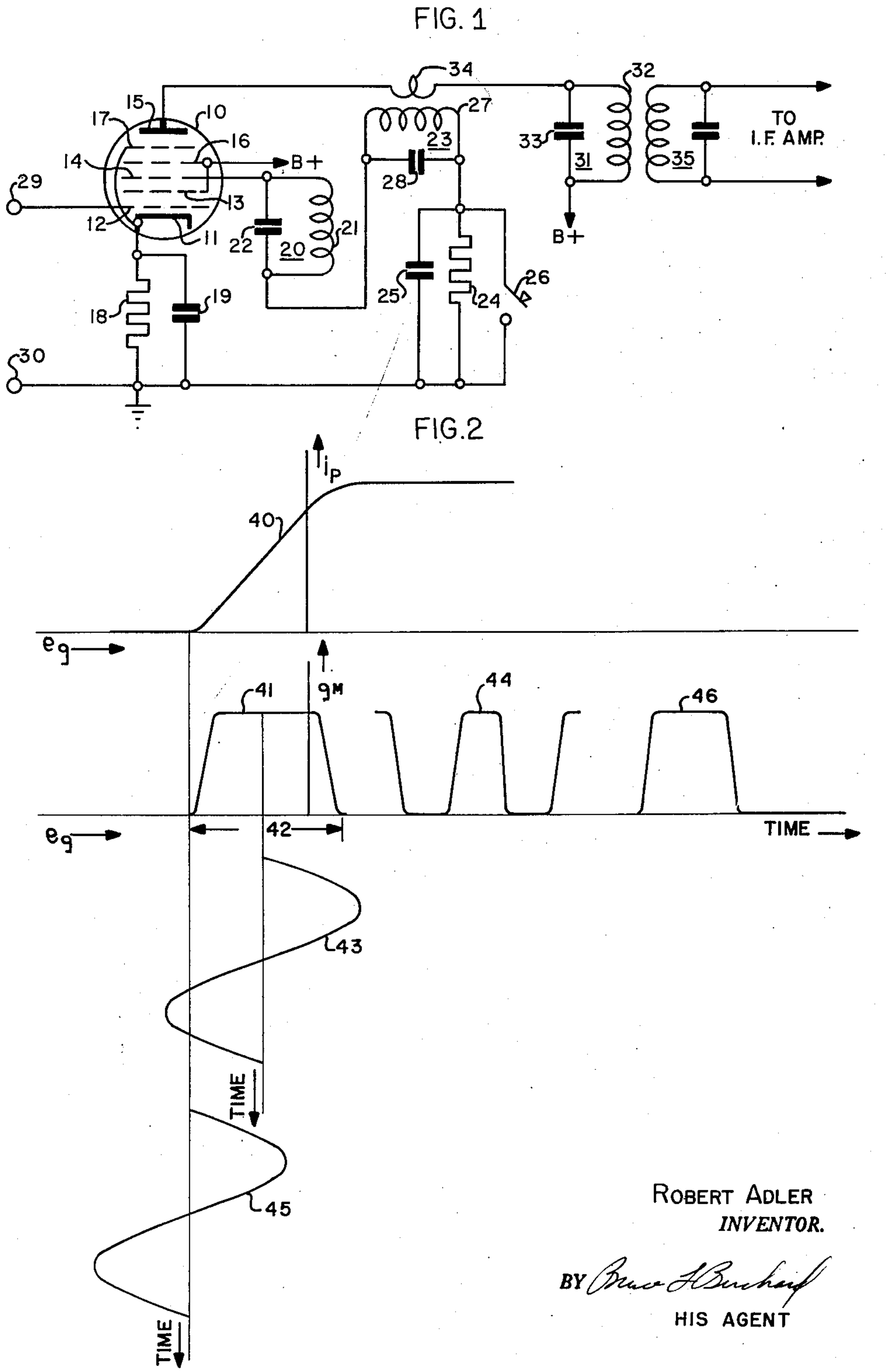

This invention relates to signal translating apparatus and more particularly to radio-frequency amplifiers and frequency converters especially suited for use in amplitude modulation and frequency modulation radio receivers.

In the reception of radio waves incorporating signal information modulated on a high frequency carrier, it is customary to provide at least one stage of radio-frequency amplification. Conventional receivers of the superheterodyne type employ a converter stage, following the radio-frequency amplifier, in which the incoming signal is heterodyned with locally generated oscillations in order to provide an intermediate-frequency signal which is readily amplifiable before detection. Thus, in conventional receivers, radio-frequency amplification and frequency conversion require jointly two stages, each incorporating an electron discharge device.

It is an important object of this invention to provide an amplifier-converter in which radio-frequency amplification and frequency conversion are effected along a single electron stream.

It is a further object of the invention to provide an improved and simplified amplifier-converter which utilizes space charge coupling effects to achieve substantial radio-frequency signal gain at least comparable with the gain obtainable in a conventional single stage radio-frequency amplifier.

It is a further object of the invention to accomplish radio-frequency amplification and heterodyning along a single electron stream while utilizing an extremely small number of circuit components thereby to facilitate mass production of signal receiving apparatus on an economical basis.

In accordance with the invention, radio-frequency input signals are supplied to the input circuit of an electron discharge device having, in the order named, a cathode, an input grid, an accelerating electrode, a control grid, and an anode all disposed across a common electron path. At the input signal frequency, the input grid has an effective transconductance (to be defined hereinafter) with respect to the control grid. A circuit from the control grid to the cathode includes a two-terminal load circuit having one terminal coupled externally of the device to the control grid only and having an impedance at the input signal frequency at least as great as the reciprocal of that effective transconductance at the signal frequency. Means are provided for cyclically varying at a heterodyning frequency the transconductance of the control grid with respect to the anode. An output circuit, selective to a frequency corresponding to an intermodulation product of the input signal frequency and the heterodyning frequency, is coupled to the anode and the cathode. With this arrangement, radio frequency signal amplification occurs between the input grid and the control grid, and frequency conversion is effected by virtue of the variation of the transconductance of the control grid with respect to the anode.

Figure 3:
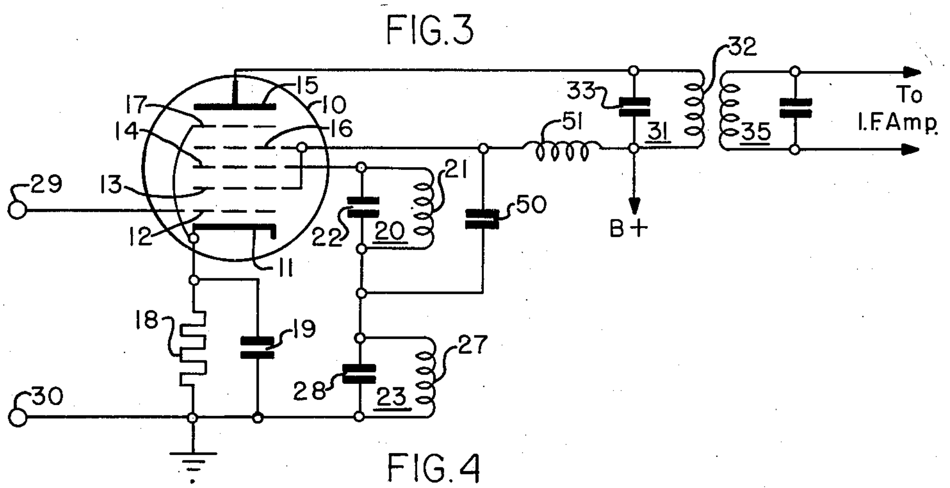
Figure 4:
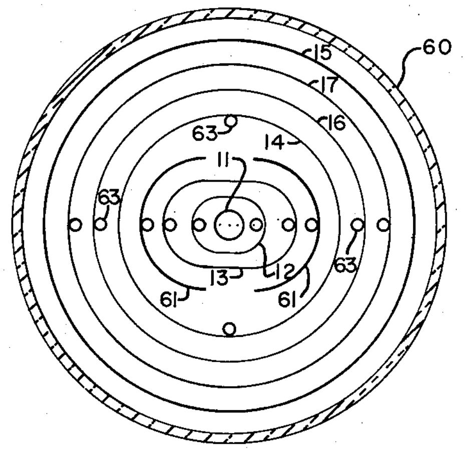
Figure 5:
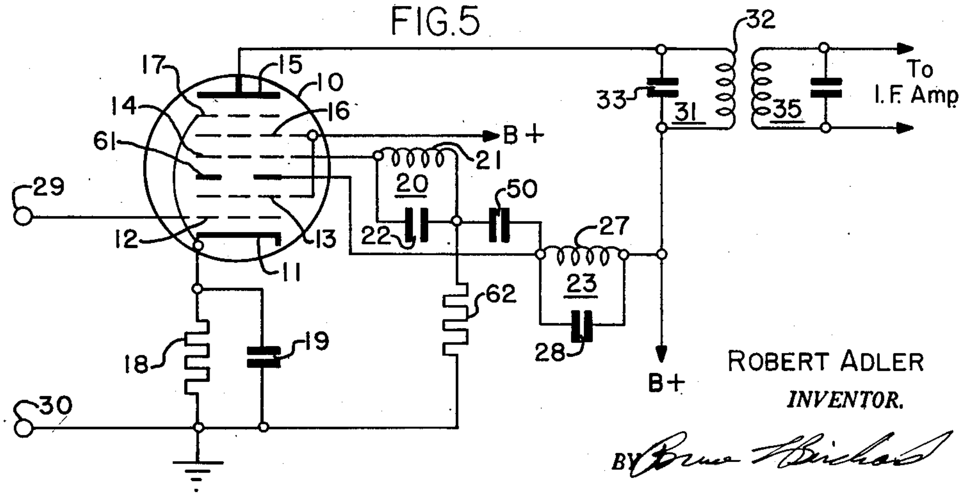

The features of the invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

Figure 1 is a schematic diagram of an amplifier-converter embodying the present invention, Figure 2 is a graphical representation useful in understanding the manner of operation of the amplifier-converter shown schematically in Figure 1, Figure 3 is a schematic diagram of a further embodiment of the invention, Figure 4 is a sectional view of a special type of electron discharge device particularly useful in connection with the present invention, and Figure 5 is a schematic diagram of an amplifier-converter embodying the device of Figure 4 and constructed in accordance with the present invention.

With reference to Figure 1, there is shown in schematic form an amplifier-converter embodying an electron discharge device 10 which includes in the order named a cathode 11, an input grid 12, an accelerating electrode 13, a control grid 14, and an anode 15 all disposed across a common electron path; a conventional screen grid 16 and a suppressor grid 17 may be included between control grid 14 and anode 15. While the accelerating electrode 13 has been schematically represented as having a grid construction, a slotted construction may be employed with equal advantage. Suppressor grid 17 is connected to cathode 11. Cathode 11 is connected to ground through a passive biasing network comprising a resistor 18 and an associated bypass condenser 19.

A two-terminal load circuit 20, comprising the parallel combination of an inductor 21 and a condenser 22, is coupled between control grid 14 and cathode 11 through an oscillatory circuit 23 and a biasing network comprising the parallel combination of a resistor 24, a bypass condenser 25, and a short circuiting switch 26 one terminal of load circuit 20 being coupled externally of device 10 to control grid 14 only. Oscillatory circuit 23 may comprise the parallel combination of an inductor 27 and a condenser 28. Load circuit 20 may be tunable, as for example by means of an iron core associated with inductor 21, to the frequency of the input signals applied between input grid 12 and cathode 11 by means of an input circuit comprising input terminals 29 and 30.

An output circuit 31, which may comprise the parallel combination of an inductor 32 and a condenser 33, is coupled to anode 15 through a feedback coil 34 which is inductively coupled to coil 27 of oscillatory circuit 23. Unidirectional operating potential is supplied to anode 15 through output circuit 31 and feedback coil 34 from a suitable source, here conventionally designated by the symbol B+. Output signals appearing in output circuit 31 are transferred to a conventional intermediate frequency amplifier (not shown) through a secondary circuit 35 inductively coupled to output circuit 31.

It is known in the art that when a stream of electrons is accelerated under the influence of a high potential electrode and is thereafter retarded by a grid operating at approximately zero potential, a space charge cloud or virtual cathode is established in the vicinity of the low potential grid. Most of the emitted electrons terminate at the high potential screen electrode or at the anode, and few electrons strike the low potential grid.

If now, the stream of electrons is varied before passing through the high potential electrode, as by a signal impressed on the input grid, the charge density of the virtual cathode is caused to vary in a corresponding manner, and a signal frequency potential variation is established at the low potential grid by electrostatic induction; consequently, a corresponding current is capacitively induced in the circuit coupled between the low potential grid and the cathode.

This effect, hereinafter termed the space charge coupling effect, has been formally likened to a unilateral negative capacity, from the input grid to the low potential grid, which has a magnitude in the order of several micro-micro-farads. As a first approximation, the term "effective transconductance" is employed to signify the susceptance at the input signal frequency of the equivalent space charge coupling capacity from one electrode to another, as for example from the input grid to the low potential control grid. If the input signal frequency is designated $f$, and the equivalent space charge coupling capacity is denoted by the letter C, the effective transconductance, at the input signal frequency, of the input grid with respect to the control grid is approximately $2\pi fC$.

The effective transconductance is thus proportional of the signal frequency and attains the order of magnitude of the static transconductance (as commonly defined) of the input grid at frequencies of about 100 to 200 megacycles per second. Transit time effects prevent any further increase of effective transconductance at higher frequencies. Furthermore, transit time affects introduce a certain unavoidable amount of phase delay. The effective transconductance is, however, of very useful magnitude in the frequency ranges presently used, for example, in frequency modulation and television broadcasting.

The effective transconductance may be accurately measured by applying an input signal to the first grid 12 and observing the signal frequency current induced in the circuit coupled to the low potential or control grid 14. The effective transconductance at the particular signal frequency used in then defined as used in the following description and in the appended claims, as the amount of signal frequency current in the circuit coupled to the control grid 14 per unit signal frequency input voltage.

In operation, application of suitable positive operating potential, as from source B+, to the accelerating electrode 13 operates to establish a virtual cathode in the vicinity of control grid 14. Application of a radio frequency input signal between the input terminals 29 and 30 effects a corresponding variation in the charge density of the virtual cathode and electrostatically induces a current of corresponding frequency in the load circuit 20. If the parameters of load circuit 20 are so chosen that the impedance of such circuit at the frequency of the input signals is at least equal to the reciprocal of the effective transconductance of the input grid 12 with respect to the control grid 14 at that frequency, voltage amplification occurs between input grid 12 and control grid 14. In practice, it is preferred that the impedance of load circuit 20 at the input signal frequency be substantially greater than the reciprocal of such effective transconductance, and ratios of impedance to effective transconductance as large as 100 may advantageously be employed.

At the same time, oscillations of a predetermined frequency are induced in oscillatory circuit 23 as the result of feedback from anode 15 to control grid 14 through feedback coil 34 and oscillatory circuit 23. The oscillations appearing in circuit 23 are injected on control grid 14, thereby cyclically to vary the transconductance of control grid 14 with respect to anode 15 at a heterodyning frequency which is harmonically related to the preselected frequency to which oscillatory circuit 23 is tuned. With short circuiting switch 26 open, as shown, the heterodyning frequency is equal to the frequency of oscillations appearing in circuit 23, and with switch 26 closed, the heterodyning frequency corresponds to the second harmonic of the frequency of oscillatory circuit 23, as will be explained.

Since control element 14 is a grid, potential variations in the load circuit 20 impress a new and amplified radio-frequency signal on the electron steam between cathode 11 and anode 15, and intermodulation between this new and amplified signal and the local oscillations from circuit 23 occurs in a manner well known in the art. Output circuit 31 is tuned to a frequency corresponding to an intermodulation product of the input signal frequency and the heterodyning frequency at which the transconductance of control grid 14 is varied.

The process of frequency conversion which takes place in the circuit of Figure 1 may readily be understood by reference to Figure 2. Curve 40 represents the control grid voltage-anode current characteristic of an electron discharge device in which a control grid follows an accelerating electrode, as for example device 10 of Figure 1. Curve 41 represents the control grid voltage versus control grid-to-anode transconductance characteristic of the same tube and may be plotted along the same abscissa as the control grid voltage-anode current characteristic 40. It is to be noted that with a tube having a control grid voltage-anode current characteristic of the type of curve 40, which resembles a step function, the control grid voltage versus control grid-to-anode transconductance characteristic has a range 42 of high transconductance bounded on each side by a region of substantially zero transconductance.

In the operation of the circuit of Figure 1, when short circuiting switch 26 is closed, biasing resistor 24 is short circuited, and control grid 14 is biased to an operating point substantially in the center of range 42 of high transconductance. If there is injected on control grid 14 (Fig. 1) an oscillatory voltage of the form of curve 43, having a peak-to-peak amplitude greater than the width of high transconductance region 42, the transconductance variation of control grid 14 with respect to anode 15 is represented graphically as curve 44 and is characterized by two positive peaks for each cycle of the oscillatory voltage 43.

When a signal voltage is injected on control grid 14, intermodulation occurs and the current to anode 15 contains components corresponding in frequency to the intermodulation products of the second harmonic of the predetermined oscillator frequency and the input signal frequency, since the output current is a function of the signal voltage and the transconductance of the control grid with respect to the anode. Output circuit 31 may be tuned to select any desired intermodulation component and is preferably tuned to the difference between the second harmonic of the predetermined oscillator frequency and the signal frequency.

This specific type of second harmonic conversion is specifically disclosed and claimed in the copending application of Robert Adler, Serial No. 67,231, filed December 24, 1948, for "Converters," and assigned to the present assignee.

When short circuiting switch 26 (Figure 1) is opened, control grid 14 is biased more negatively by virtue of the voltage drop appearing across biasing resistor 24, and bias resistor 24 may be so chosen that control grid 14 is biased to an operating point substantially at the negative boundary of high transconductance range 42. Under these conditions, when an oscillatory voltage of the form of curve 45 is injected on control grid 14, the transconductance variation of control grid 14 with respect to anode 15 is represented graphically as curve 46 and has one positive peak for each cycle of the oscillatory voltage appearing in circuit 23. It is seen, therefore, that the transconductance of the control grid 14 with respect to anode 15 is varied at a heterodyning frequency equal to the frequency of the oscillatory voltage appearing in circuit 23, and fundamental conversion takes place. Output circuit 31 may be tuned to select the desired intermodulation product.

While the load circuit 20 has been shown and described as being a tuned circuit, it is apparent that it may be tunable, as by means of a powdered iron core, for example. It is therefore contemplated, in the appended claims, that the term "tuned" may be construed to cover such an alternative construction.

Since it is contemplated that fundamental conversion may be advantageously employed, the terminology "a heterodyning frequency harmonically related" to the predetermined frequency to which oscillatory circuit 23 is tuned may be construed as reading on the fundamental (or first harmonic) of such predetermined frequency as well as on a higher order harmonic.

There is shown in Figure 3 a further embodiment of the invention in which local oscillations are induced in circuit 23 in transitron fashion. Accelerating electrode 13 and control grid 14 are maintained at the same alternating-current potential with respect to the frequency of the local oscillations by virtue of a coupling condenser 50 connected between load circuit 20 and accelerating electrode 13. Load circuit 20 is effectively isolated from B+ by means of a radio-frequency choke 51. With this arrangement, negative resistance is effected between load circuit 20 and ground, and oscillations are induced in circuit 23 in a manner well known in the art. Oscillatory circuit 23 is preferably tuned to a frequency much lower than the input signal frequency to which load circuit 20 is tuned, in which event second harmonic conversion occurs as explained above. The arrangement of Figure 3 is, in all other respects, similar to that shown in Figure 1.

There is shown in Figure 4 a sectional view of a specially constructed tube which may be particularly desirable when radiation from the input circuit must be substantially prevented. The tube comprises a cathode 11, an input grid 12, an accelerating electrode 13, a control grid 14, a screen grid 16, a suppressor grid 17, and an anode 15 concentrically located within an evacuated envelope 60. An apertured electrode 61 is provided between accelerating electrode 13 and control grid 14. The electrodes are maintained in predetermined space relation by means of support members 63, shown schematically, which may be of conventional construction. The device of Figure 4 differs in construction from a conventional converter tube in that electrode 61 is mechanically and electrically separate from accelerating electrode 13.

Figure 5 is a schematic representation of a variation of the circuit of Figure 3 which incorporates a device of the type shown in Figure 4. In the arrangement of Figure 5, oscillatory circuit 23 is connected between B+ and apertured shield electrode 61, and bypass condenser 50 is connected between load circuit 20 and oscillatory circuit 23. A direct current return path is provided for control electrode 14 by means of a grid leak resistor 62 connected between load circuit 20 and ground. In all other respects, the circuit of Figure 5 is identical with that of Figure 3. In the embodiment of Figure 5, the sole function of accelerating electrode 13 is to serve as a screen between shield electrode 61 and input grid 12; in this manner, the interelectrode capacity between shield electrode 61 and input grid 12 is substantially reduced and radiation from the input circuit is substantially prevented.

Purely by way of illustration, and in no sense by way of limitation, the following component values may be used in the circuit of Figure 1 to provide an overall gain from input grid 12 to output circuit 31 of about 40 times when the signal frequency is 100 megacycles per second, the local oscillator frequency is 55 megacycles per second, and the output circuit 31 is tunable to a frequency of 10 megacycles per second:

| | |
|---|---|
| Electron discharge device 10 | Type 6BA7 |
| Inductor 21 | .09 μh. |
| Condenser 22 | 18 μμf. |
| Inductor 27 | .08 μh. |
| Condenser 28 | 100 μμf. |
| Inductor 32 | 7.2 μh. |
| Condenser 33 | 26 μμf. |

It will be seen that the invention provides an improved and simplified combination radio frequency amplifier and frequency converter which affords in a single electron path an overall gain comparable with that obtainable with a conventional radio frequency amplifier stage followed by a conventional frequency converter.

While the invention has been shown and described in connection with certain specific embodiments thereof, it is to be understood that numerous variations and modifications may be made. It is therefore contemplated in the appended claims to cover all such variations and modifications as fall within the true spirit and scope of the invention.

I claim:

1. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal at least equal to the reciprocal of the effective transconductance, at said input-signal frequency, of said input grid with respect to said control grid for developing an amplified signal at said input-signal frequency by space charge coupling from said input grid and for impressing said amplified signal on said control grid; means including a tuned circuit for cyclically varying at a heterodyning frequency the transconductance of said control grid with respect to said anode; and an output circuit coupled to said anode and said cathode and selective to a frequency corresponding to an intermodulation product of said input-signal frequency and said heterodyning frequency.

2. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; means including a tuned circuit for cyclically varying at a heterodyning frequency the transconductance of said control grid with respect to said anode; and an output circuit coupled to said anode and said cathode and selective to a frequency corresponding to an intermodulation product of said input-signal frequency and said heterodyning frequency.

3. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only, comprising an inductor shunted by capacitance and being tuned to the frequency of said input signal for developing an amplified signal at said input-signal frequency by space charge coupling from said input grid and for impressing said amplified signal on said control grid; means including a tuned circuit for cyclically varying at a heterodyning frequency the transconductance of said control grid with respect to said anode; and an output circuit coupled to said anode and said cathode and selective to a frequency corresponding to an intermodulation product of said input-signal frequency and said heterodyning frequency.

4. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; means including a tuned circuit included in said control grid-cathode circuit for cyclically varying at a heterodyning frequency the transconductance of said control grid with respect to said anode; and an output circuit coupled to said anode and said cathode comprising an inductor shunted by capacitance and being tuned to a frequency corresponding to an intermodulation product of said input-signal frequency and said heterodyning frequency.

5. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; means including a tuned circuit for cyclically varying at a heterodyning frequency the transconductance of said control grid with respect to said anode; and an output circuit coupled to said anode and said cathode comprising an inductor shunted by a condenser and being tuned to a frequency corresponding to the difference between said input-signal frequency and said heterodyning frequency.

6. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; a parallel resonant circuit included in said control grid-cathode circuit and tuned to a predetermined frequency, and a feedback coil coupled to said anode and said cathode and inductively coupled to said parallel resonant circuit for inducing oscillations therein at said predetermined frequency thereby cyclically to vary the transconductance of said control grid with respect to said anode at a heterodyning frequency harmonically related to said predetermined frequency; and an output circuit coupled to said anode and said cathode comprising an inductor shunted by capacitance and being tuned to a frequency corresponding to an intermodulation product of said input-signal frequency and said heterodyning frequency.

7. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only, comprising an inductor shunted by a condenser and being tuned to the frequency of said input signal for developing an amplified signal at said input-signal frequency by space charge coupling from said input grid and for impressing said amplified signal on said control grid; a parallel resonant circuit included in said control grid-cathode circuit and tuned to a predetermined frequency, and a feedback coil coupled to said anode and said cathode and inductively coupled to said parallel resonant circuit for inducing oscillations therein at said predetermined frequency thereby cyclically to vary the transconductance of said control grid with respect to said anode at a heterodyning frequency harmonically related to said predetermined frequency; and an output circuit coupled to said anode and said cathode comprising an inductor shunted by a condenser and being tuned to a frequency corresponding to the difference between said input-signal frequency and said heterodyning frequency.

8. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; a condenser coupling said accelerating electrode to said control grid-cathode circuit, and a parallel resonant circuit included in said control grid-cathode circuit and tuned to a predetermined frequency whereby the transconductance of said control grid with respect to said anode is varied cyclically at a heterodyning frequency harmonically related to said predetermined frequency; and an output circuit coupled to said anode and said cathode comprising an inductor shunted by capacitance and being tuned to a frequency corresponding to an intermodulation product of said input-signal frequency and said heterodyning frequency.

9. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only, comprising an inductor shunted by a condenser and being tuned to the frequency of said input signal for developing an amplied signal at said input-signal frequency by space charge coupling from said input grid and for impressing said amplified signal on said control grid; a condenser coupling said accelerating electrode to said control grid-cathode circuit, and a parallel resonant circuit included in said control grid-cathode circuit and tuned to a predetermined frequency whereby the transconductance of said control grid with respect to said anode is varied cyclically at a heterodyning frequency harmonically related to said predetermined frequency; and an output circuit coupled to said anode and said cathode comprisiing an inductor shunted by a condenser and being tuned to a frequency corresponding to the difference between said input-signal frequency and said heterodyning frequency.

10. An amplifier-converter comprising: an electron discharge device including in the order named a cathode, an input grid, an accelerating electrode, an apertured electrode, a control grid, and an anode disposed across a common electron path; an input circuit including said input grid and said cathode for receiving a radio frequency input signal; a circuit from said control grid to said cathode including a two-terminal load circuit having on terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; means for maintaining said apertured electrode at a positive unidirectional operating potential, a condenser coupling said apertured electrode to said control grid-cathode circuit, and a parallel resonance circuit included in said control grid-cathode circuit and tuned to a predetermined frequency, whereby the transconductance of said control grid with respect to said anode is varied cyclically at a heterodyning frequency harmonically related to said predetermined frequency; and an output circuit coupled to said anode and said cathode comprising an inductor shunted by capacitance and being tuned to a frequency corresponding to an intermodulation product of said input-signal frequency and said heterodyning frequency.

11. An amplifier-converter comprising: an electron discharge device including in the order named a cathode, an input grid, an accelerating electrode, an apertured electrode, a control grid, and an anode disposed across a common electron path; an input circuit including said input grid and said cathode for receiving a radio frequency input signal; a circuit from said control grid to said cathode including a two-terminal load circuit having one terminal coupled externally of said device to said control grid only, comprising an inductor shunted by a condenser and being tuned to the frequency of said input signal for developing an amplified signal at said input-signal frequency by space charge coupling from said input grid and for impressing said amplified signal on said control grid; means for maintaining said apertured electrode at a positive unidirectional operating potential, a condenser coupling said apertured electrode to said control grid-cathode circuit, and a parallel resonant circuit included in said control grid-cathode circuit and tuned to a predetermined frequency, whereby the transconductance of said control grid with respect to said anode is varied cyclically at a heterodyning frequency harmonically related to said predetermined frequency; and an output circuit coupled to said anode and said cathode comprising an inductor shunted by a condenser and being tuned to a frequency corresponding to the difference between said input-signal frequency and said heterodyning frequency.

12. An amplifier-converter comprising: an electron discharge device including in the order named a cathode, an input grid, an accelerating electrode, a control grid, and an anode disposed across a common electron path and having a control grid-to-anode transconductance versus control grid voltage characteristic including a range of maximum transconductance bounded on each side by a region of substantially zero transconductance; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal at least equal to the reciprocal of the effective transconductance, at said input-signal frequency, of said input grid with respect to said control grid for developing an amplified signal at said input-signal frequency by space charge coupling from said input grid and for impressing said amplified signal on said control grid; a source of oscillatory voltage of a predetermined frequency and of a peak-to-peak amplitude greater than the width of said maximum transconductance range coupled to said control grid and said cathode; means for maintaining said control grid at an operating point substantially at the center of said maximum transconductance range, whereby the transconductance of said control grid with respect to said anode is cyclically varied at a frequency corresponding to the second harmonic of said predetermined frequency; and an output circuit coupled to said anode and said cathode and selective to a frequency corresponding to an intermodulation product of said input-signal frequency and said second harmonic.

13. An amplifier-converter comprising: an electron discharge device including in the order named a cathode, an input grid, an accelerating electrode, a control grid, and an anode disposed across a common electron path and having a control grid voltage-control grid-to-anode transconductance characteristic including a range of maximum transconductance bounded on each side by a region of substantially zero transconductance; an input circuit including said input grid and said cathode for receiving a radio frequency input signal; a circuit from said control grid to said cathode including a two-terminal load circuit having one terminal coupled externally of said device to said control grid only and having an impedance at the frequency of said input signal at least equal to the reciprocal of the effective transconductance, at said input-signal frequency, of said input grid with respect to said control grid for developing an amplified signal at said input-signal frequency by space charge coupling from said input grid and for impressing said amplified signal on said control grid; a source of oscillatory voltage of a predetermined frequency coupled to said control grid and said cathode; means for maintaining said control grid at an operating point in one of said regions of substantially zero transconductance, whereby the transconductance of said control grid with respect to said anode is cyclically varied at said predetermined frequency; and an output circuit coupled to said anode and said cathode and selective to a frequency corresponding to an intermodulation product of said input-signal frequency and said predetermined frequency.

14. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; an oscillation generating system coupled to said control grid and said cathode for cyclically varying at a heterodyning frequency the transconductance of said control grid with respect to said anode; a two-terminal load circuit included in said oscillation generating system having one terminal coupled externally of said device to said control grid only and having an impedance at the frequency of said input signal at least equal to the reciprocal of the effective transconductance, at said input-signal frequency, of said input grid with respect to said control grid for developing an amplified signal at said input-signal frequency by space charge coupling from said input grid and for impressing said amplified signal on said control grid; and an output circuit coupled to said anode and said cathode and selective to a frequency corresponding to an intermodulation product of said input-signal frequency and said heterodyning frequency.

15. An amplifier-converter comprising: an electron discharge device including in the order named a cathode, an input grid, an accelerating electrode, a control grid, and an anode disposed across a common electron path; an input circuit including said input grid and said cathode for receiving a radio frequency input signal; an oscillation generating system coupled to said control grid and said cathode for cyclically varying at a heterodyning frequency the transconductance of said control grid with respect to said anode; a two-terminal load circuit included in said oscillation generating system having one terminal coupled externally of said device to said control grid only and having an impedance at the frequency of said input signal substantially greater than the reciprocal of the effective transconductance, at said input-signal frequency, of said input grid with respect to said control grid for developing an amplified signal at said input-signal frequency by space charge coupling from said input grid and for impressing said amplified signal on said control grid; and an output circuit coupled to said anode and said cathode and selective to a frequency corresponding to the difference between said input-signal frequency and said heterodyning frequency.

ROBERT ADLER.

REFERENCES CITED

The following references are of record in the file of this patent:

UNITED STATES PATENTS

| Number | Name | Date |
|---|---|---|
| 2,051,178 | Roberts | Aug. 18, 1936 |
| 2,067,536 | Klotz | Jan. 12, 1937 |
| 2,088,043 | Strutt | July 27, 1937 |
| 2,256,067 | Van Slooten | Sept. 16, 1941 |
| 2,268,830 | Kleen | Jan. 6, 1942 |
| 2,323,250 | Smith | June 29, 1943 |
| 2,459,283 | McNall | Jan. 18, 1949 |